United States Patent

[11] 3,607,614

| | | |
|---|---|---|
| [72] | Inventors | Iain Andrew MacKay<br>London, England;<br>Nanbhai Bharucha, Montreal, Quebec, Canada |
| [21] | Appl. No. | 804,307 |
| [22] | Filed | Mar. 4, 1969 |
| [45] | Patented | Sept. 21, 1971 |
| [73] | Assignee | The British Non-Ferrous Metals Research Association<br>London, England |

[54] ADHESIVES
5 Claims, No Drawings

[52] U.S. Cl......................................................... 161/218,
156/327, 161/216, 174/107, 260/45.8 SN,
260/87.3, 260/88.1 PC
[51] Int. Cl......................................................... C08f 45/60,
C09j 3/14, H01b 7/20
[50] Field of Search............................................ 260/45.8
SN, 302 SD, 88.1; 161/216, 218; 156/327, 334;
174/107

[56] References Cited

UNITED STATES PATENTS

| 2,719,125 | 9/1955 | Roberts................... | 252/46.7 |
| 3,197,553 | 7/1965 | Nicolas.................... | 174/107 |
| 3,379,821 | 4/1968 | Garner..................... | 174/36 |
| 3,402,098 | 9/1968 | Baum et al................ | 161/190 |
| 3,459,877 | 8/1969 | Bullock et al............. | 174/107 |

*Primary Examiner*—Donald E. Czaja
*Assistant Examiner*—R. A. White
*Attorney*—Wenderoth, Lind & Ponack

ABSTRACT: An adhesive, for a metal, particularly for adhering lead to a polyolefin, contains an addition of 2,5-dimercaptothiadiazole in an amount suitable to act as a complexing agent for the metal so as to create a barrier to prevent acidic scission products formed in the adhesive from reacting with the metal and destroying adhesion.

ADHESIVES

This invention provides adhesives, and, more particularly, adhesives for lead to polyolefins, e.g., polyethylene.

A composite of polyethylene with lead foil or strip has attractive properties for applications such as cable sheathings, building panels and packaging, including collapsible tubes, in which the lead, appropriately thick, provides a barrier to moisture or noise. If the lead is not to be fractured by high local strains in the composite, which are readily acceptable by the polyethylene, and is to recover without buckling when the stress is removed, strong cohesion is necessary. However, it is difficult to achieve a satisfactory bond between lead and polyethylene and to maintain its strength over a long period, failure occurring largely at the metal/adhesive interface.

While the number of adhesive systems available has considerably increased recently, the nature and mechanism of adhesion remains controversial. Contemporary views on adhesion may be broadly divided into two categories, though these are not actually mutually exclusive: (i) mechanical adhesion and (ii) chemical adhesion.

The mechanical-adhesion theory relies on the fact that all solid surfaces are very rough even if they are polished; it has therefore been suggested that adhesion is very largely, if not solely, due to the penetration of the liquid adhesive into the imperfections of the surface, giving rise to good mechanical keying after solidification.

The chemical adhesion theory postulates a chemical interaction between the substrate and the adhesive. The nature of the chemical bonding and the relative contribution of the different types of forces involved in bonding are in considerable dispute but a broadly accepted view is that the main component of the chemical bonding largely arises from the attractions exercised by the polar constituents in the adhesive or coating for the polar metal oxide surface.

The importance of polar constituents in achieving good bonding to the metal surface has provided ample support for a chemical adhesion theory. The chemical-bonding theory includes the ease of wetting in so far as the wetting of a metal surface is a function of polar groups.

Good initial adhesion to metal surfaces therefore seems to depend on polar groups in the adhesive coating, a large number of polar groups ensuring good adhesion. Such an effect, however, has the serious drawback that chemical reactions involving polar materials continue inside the film matrix, especially in the presence of small amounts of water and oxygen, leading in many cases to increased polymerization and to the formation of acidic scission products. The acidic products react with the metal surface forming metal soaps and salts as corrosion products at the metal/adhesive interface, and thus ultimately destroy the adhesion. Continued polymerization also results in cross-linking and shrinkage, and this additionally contributes to the breaking of the adhesive bond. The basic dilemma in achieving long-lasting good adhesion is thus that the very considerations that are responsible for securing good initial adhesion are also chiefly responsible for its ultimate destruction. The selection of an adhesive generally involves a compromise between these opposing considerations, with their attendant limitations.

We have now found that these limitations may be overcome by incorporating an organic complexing agent for metal into a suitable adhesive. It is thought that the complexing agent reacts preferentially with the metal surface, creating a barrier to the acidic scission products and preventing them from reacting with the metal and destroying adhesion.

This invention provides an adhesive for a metal, which adhesive contains an addition of 2,5-dimercaptothiadiazole in an amount suitable to act as a complexing agent for the metal so as to create a barrier to prevent acidic scission products formed in the adhesive from reacting with the metal and destroying adhesion. Proportions of the 2,5-dimercaptothiadiazole are preferably from 0.1% to 1.0% by weight on the weight of the adhesive; when less than 0.1% is used, the effect in prolonging adhesion may be rather small, and use of more than 1% does not provide any substantial improvement.

The adhesive may conveniently be based on any natural or synthetic organic material which is conventionally used as an adhesive for metals. Examples of various classes of adhesive (with the Trade Names of specific products within the class given in brackets) are as follows:

Synthetic rubbers—(3M–EC711, EC1022, EC1099).
Oil resistant elastimers—(3M–EC2210).
Epoxy resins–(Araldite AY111, 3M–Scotchweld EC2216 B/A).
Acrylic acid copylymer with ethylene—(DOW QX2375).
Vinyl acetate copolymer with ethylene—(DuPont–Elvax 260).

The invention is chiefly concerned with the bonding of lead to polyethylene, and includes any composite including lead and a polyolefin, particularly polyethylene, in which the lead and the polyolefin have been adhered together using the adhesive defined above. The preferred classes of adhesive for this application of the invention are copolymers of olefins with polar compounds containing olefinic groupings, e.g., vinyl or acrylic compounds, and in particular the acrylic acid/ethylene copolymer and the vinyl acetate/ethylene copolymer quoted above.

The following experimental data illustrates the invention.

PRELIMINARY TESTS

Copper-bearing lead 20 mil. thick, was degreased in acetone and brightened in 10% hydrochloric acid, water rinsed and wiped dry. The polyethylene was 20 mil. thick density sheet. This was rinsed clean in acetone, and wiped dry prior to treatment or preparation of bond. The adhesive used in this series of tests are those commercially available adhesives listed above, i.e., not containing the 2,5-dimercaptothiadiazole additive of this invention. In all cases except the two coplymer adhesives, the polyethylene surface was oxidized in a solution of acidified potassium dichromate for 30 minutes at 60° C. prior to bonding to render the surface more polar. The adhesives were applied in one of two ways: (i) as fluid, bonds between lead and polyethylene being formed after allowing the adhesives to tack dry, or (ii) after heating the sandwich of lead and polyethylene. The two solid adhesives—the ethylene copolymers—were applied by pressing sheet lead, adhesive and polyethylene together under a nominal pressure for 15 minutes at a temperature of 180° to 200° C. Comparative tests of peel strength of the bonds were made with a Hounsfield Tensometer testing machine. ASTM D903-49 standard "Peel or Stripping Strength of Adhesives" was used as a guide to testing procedure. The peel strength tests were carried out on lead and polyethylene bonded with the as-supplied adhesives listed above, using a bond width of 1 inch and a tensometer head speed of 2 inch/min. The results are shown in Table I.

TABLE I

Peel strength of 20 mil. lead bonded to 60 mil. polyethylene

| Adhesive | Peel Adhesion lb./in. width |
|---|---|
| EC 711 | 10 |
| EC 1022 | 4 |
| EC 1099 | 3 |
| EC 2210 | 5 |
| EC 2216B/A | 3 |
| ARALDITE AY111 | 4 |
| QX 2375 (15 mil. film) | 16–18 |
| ELVAX 260 (15 mil. film) | 7–8 |

The mechanism of bond failure varied with the class of adhesive. The synthetic rubbers and elastomer failed with a certain degree of shear during the latter part of the test. The epoxy resin bonds broke down at the adhesive/polythylene interface, the bonds tending to be very brittle. The ethylene copolymers failed at the adhesive/lead interface. Apart from showing good-to-excellent peel strength, the copolymers were also very flexible.

The 15 minute bonding time for the test described above in respect of the two copolymers may not be the optimum time. A range of bonding times from 4 to 60 minutes at the same temperature of 180° to 200° C. were therefore tested, and it was shown that bonding time had little significant effect on either copolymer adhesive.

EXAMPLE

Pellets of both copolymers QX 2375 and ELVAX 260 were treated in a mixture of toluene and acetone (90/10) containing 2.5-dimercaptothiadiazole. The temperature was raised above the softening point of the adhesive (110° C.) and a homogeneous solution prepared by stirring. The solution was held at this temperature and the solvents driven off leaving the adhesive with an even distribution of 2,5-dimercaptothiadiazole in the copolymer, a film of the adhesive was then formed in a thermostatically controlled press. An adequate concentration of lead complexing agent was found by preliminary bond-strength tests to be one-half percent by weight of adhesive.

Peel strength tests were carried out on lead/polyethylene composites bonded with the copolymers containing one-half percent 2,5-dimercaptothiadiazole following the procedure as in ASTM D903-49. They showed no significant change in bond strength from the untreated adhesives. Ageing tests were undertaken on the bonds formed with and without the addition of one-half percent 2,5-dimercaptothiadiazole by ageing separate bonded samples at 85° C. in air and at 50° C. in water for 4 days each. The results of these tests are shown in Table II.

TABLE II

Peel strength of 20 mil lead and 60 mil polyethylene bonded by treated and untreated copolymers (lb./inch width)

| | Adhesive (at least 3 replicate samples) | | | | | |
|---|---|---|---|---|---|---|
| | Elvax 260 | | | QX 2375 | | |
| Addition | Initial | Aged 4 days 85° C. in air | Aged 4 days 50° C. in water | Initial | Aged 4 days 85° C. in air | Aged 4 days 50° C. in water |
| None | 7-8 | 7-8 | 0-2 | 16-18 | 0-1 | 0-1 |
| 2,5-dimercaptothiadiazole | 7-8 | 14-17 | 9-13 | 16-17 | 15-16 | 12-16 |

Breakdown encountered on ageing QX 2375 bonds in air and water, and Elvax 260 in water, did not occur when 2,5-dimercaptothiadiazole had been incorporated in the adhesive. With Elvax 260 peel strength rose on ageing. It was observed that the lead surface possessed a pale green coloration indicating the formation of the lead, 2,5-dimercaptothiadiazole complex.

The adhesives of this invention are useful in conjunction with metals for which 2,5-dimercaptothiadiazole is an effective complexing agent.

We claim:
1. In an adhesive of a copolymer of an olefin with a polar compound containing an olefinic grouping, the improvement which consists in incorporating therein from 0.1% to 1.0%, by weight on the weight of the adhesive, of 2,5-dimercaptothiadiazole.
2. An adhesive as claimed in claim 1, wherein the adhesive is an acrylic acid/ethylene copolymer.
3. An adhesive as claimed in claim 1, wherein the adhesive is a vinyl acetate/ethylene copolymer.
4. A composite including lead and a polyolefin, in which the lead and the polyolefin have been adhered together using the adhesive claimed in claim 1.
5. A composite as claimed in claim 4, wherein the polyolefin is a polyethylene.